(12) United States Patent
Mizutani

(10) Patent No.: US 8,767,042 B2
(45) Date of Patent: Jul. 1, 2014

(54) IMAGE PROCESSING APPARATUS AND IMAGE PROCESSING METHOD

(75) Inventor: Fumitoshi Mizutani, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 279 days.

(21) Appl. No.: 13/308,364

(22) Filed: Nov. 30, 2011

(65) Prior Publication Data

US 2012/0249732 A1    Oct. 4, 2012

(30) Foreign Application Priority Data

Mar. 28, 2011  (JP) ................................. 2011-069150

(51) Int. Cl.
  *H04N 13/00* (2006.01)
  *H04N 9/78* (2006.01)

(52) U.S. Cl.
  USPC .............................................. 348/42; 348/43

(58) Field of Classification Search
  USPC ......................................................... 348/43
  See application file for complete search history.

(56) References Cited

U.S. PATENT DOCUMENTS

| 8,330,799 B2* | 12/2012 | Arai et al. ........................ 348/43 |
| 8,384,765 B2* | 2/2013 | Takahashi et al. ............... 348/43 |
| 8,537,201 B2* | 9/2013 | Choi et al. ....................... 348/43 |
| 8,537,204 B2* | 9/2013 | Cho et al. ........................ 348/51 |
| 2009/0322857 A1* | 12/2009 | Jacobs et al. ................... 348/42 |
| 2011/0050864 A1* | 3/2011 | Bond .............................. 348/51 |
| 2012/0127268 A1* | 5/2012 | Yun et al. ........................ 348/43 |

FOREIGN PATENT DOCUMENTS

| JP | 9200190 | 7/1997 |
| JP | 2007-135089 | 5/2007 |

* cited by examiner

*Primary Examiner* — Sath V Perungavoor
*Assistant Examiner* — Howard D Brown, Jr.
(74) *Attorney, Agent, or Firm* — Blakely, Sokoloff, Taylor & Zafman LLP

(57) ABSTRACT

An image processing apparatus includes a receiving module, first and second processors, depth information generation module, and an image generation module. The receiving module receives a moving image including images. The first and second processors decode the moving image inputted from the receiving module and generate decoded data for each of the images. The depth information generation module generates, based on the decoded data generated by the first processor, depth information concerning the decoded data. The image generation module generates a parallax image, if an image with which the decoded data generated by the second processor is associated is subsequent to an image with which the depth information generated by the depth information generation module is associated, by using the decoded data generated by the second processor and depth information concerning an image subsequent to the image with which the generated depth information is associated.

7 Claims, 4 Drawing Sheets

IMAGE PROCESSING APPARATUS AND IMAGE PROCESSING METHOD

CROSS REFERENCE TO RELATED APPLICATION(S)

The present disclosure relates to the subject matters contained in Japanese Patent Application No. 2011-069150 filed on Mar. 28, 2011, which are incorporated herein by reference in its entirety.

FIELD

An exemplary embodiment of the present invention relates to an image processing apparatus and an image processing method.

BACKGROUND

There is a technique for analyzing an image construction of a two-dimensional video image and for converting the two-dimensional video image into a three-dimensional video image. In such a technique, a picture of each encoded two-dimensional video image is decoded and then analyzed to estimate a depth (depth level) for each pixel component of the picture, and a three-dimensional display parallax image is generated by using the depth estimation result and decoded video image.

In this technique, a processing speed of processing for depth estimation may differ from that of processing for two-dimensional video image decoding, and the depth estimation result and decoded image may be generated at different times. Then, in that case, if the depth estimation result and decoded image, which are associated with a single picture, are strictly synchronized to generate a parallax image, a time lag or the like may occur in generation and/or display of a parallax image for each picture, which may make it impossible to perform a suitable three-dimensional conversion process.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

According to an exemplary embodiment of the invention, there is provided an image processing apparatus including a receiving module, first and second processors, depth information generation module, and an image generation module. The receiving module is configured to receive a moving image including a plurality of images. The first and second processors are configured to decode the moving image inputted from the receiving module and to generate decoded data for each of the plurality of images. The depth information generation module is configured to generate, based on the decoded data generated by the first processor, depth information concerning the decoded data. The image generation module is configured to generate a parallax image, if an image with which the decoded data generated by the second processor is associated is subsequent to an image with which the depth information generated by the depth information generation module is associated, by using the decoded data generated by the second processor and depth information concerning an image subsequent to the image with which the generated depth information is associated.

Hereinafter, an exemplary embodiment of the present invention will be described with reference to the drawings.

Figure 1:
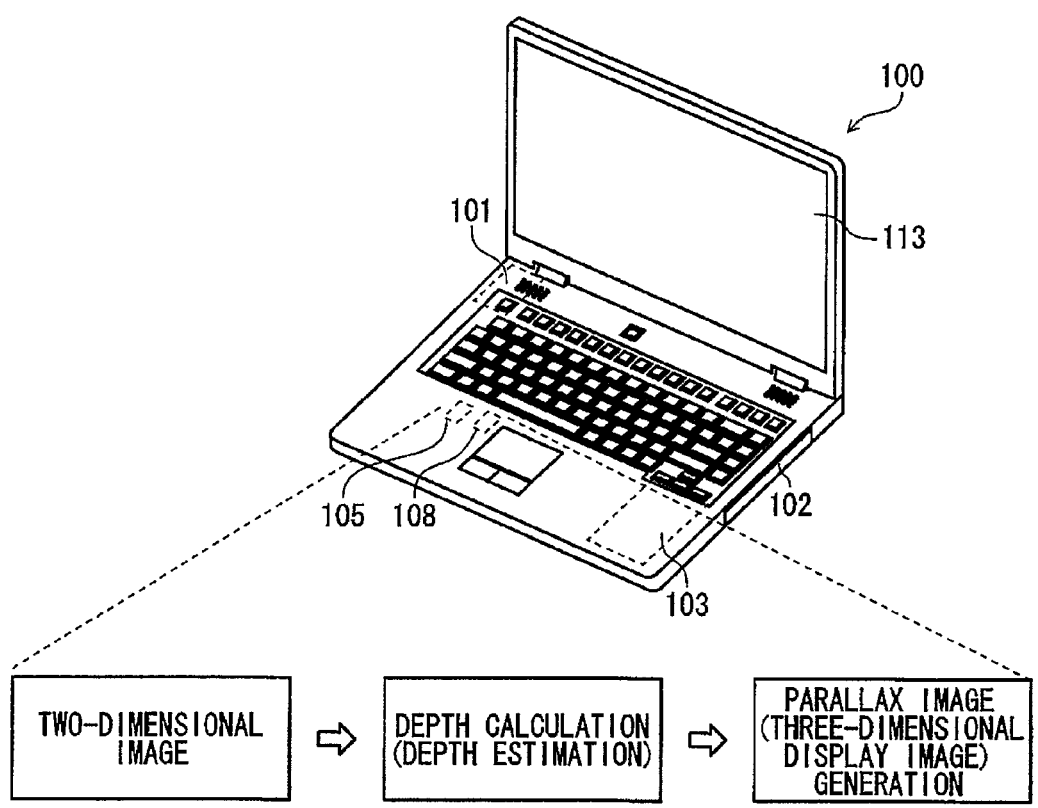
FIG. 1 is a diagram illustrating a usage example of an image processing apparatus according to an exemplary embodiment of the present invention.

FIG. 1 is a diagram illustrating a usage example of an image processing apparatus according to the embodiment. The image processing apparatus according to the embodiment is implemented as a computer 100, for example. In this embodiment, the computer 100 includes: a tuner 101; an ODD 102; a HDD 103; a first image processor 105; a second image processor 108; and a display module 113. Note that types of the computer 100 include: a laptop type in which a display cabinet and a main body cabinet are connected via a hinge; a display device integral type in which main body components such as various processors are incorporated into a display cabinet including a display device; and a desktop type in which no display device is provided and a video image signal is outputted to an external display device via a digital interface or the like.

The tuner 101, the ODD 102 and the HDD 103 output two-dimensional display encoded video image data to the first image processor 105 and the second image processor 108. Specifically, the tuner 101 receives a broadcast signal of terrestrial digital broadcasting or BS digital broadcasting, and outputs, to the processors, two-dimensional display encoded video image data on which the broadcast signal is superimposed. The ODD 102 reads two-dimensional display encoded video image data recorded on an optical disk, and outputs the read data to the processors. The HDD 103 writes/reads two-dimensional display encoded video image data to/from a magnetic recording medium, and outputs the read data to the processors.

Further, the first image processor 105 and the second image processor 108 generate three-dimensional display parallax video image data by using the inputted two-dimensional display video image data. Specifically, the first image processor 105 and the second image processor 108 analyze an image (picture) included in the two-dimensional display video image data, calculate (estimate) a depth (depth level) of each pixel in the image, and generate a parallax image having a parallax responsive to depth information of each pixel, which has been obtained by the depth calculation. Note that a parallax image means a right eye image and a left eye image having a parallax therebetween.

Figure 2:
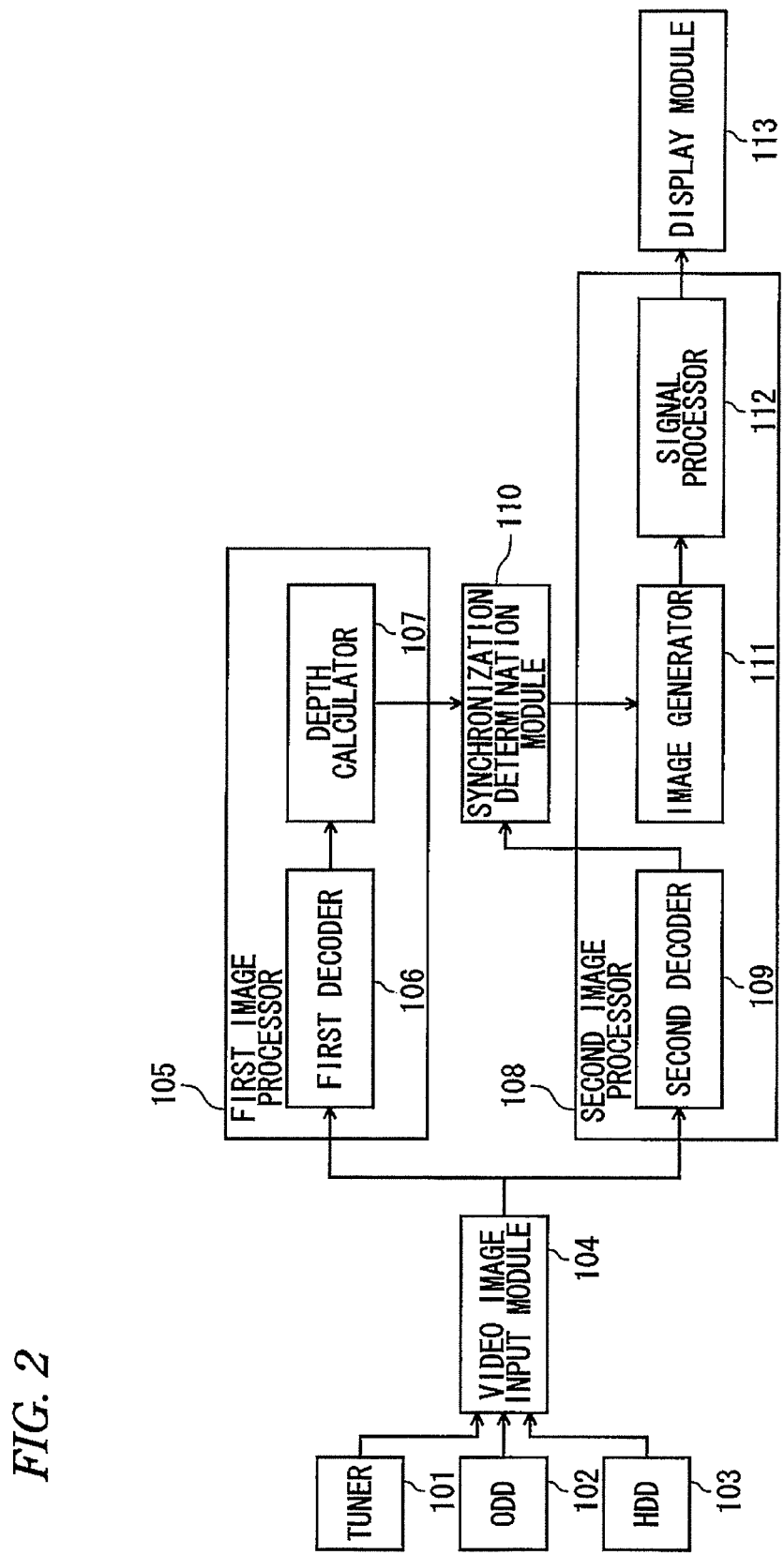
FIG. 2 is a diagram illustrating a system configuration example of the image processing apparatus according to the embodiment.

Next, referring to FIG. 2, a system configuration example of the computer 100 will be described.

The computer 100 includes: the tuner 101; the ODD 102; the HDD 103; a video image input module 104; the first image processor 105; a first decoder 106; a depth calculator 107; the second image processor 108; a second decoder 109; a synchronization determination module 110; an image generator 111; a signal processor 112; and the display module 113.

The tuner 101 receives a television broadcast signal received by, for example, a terrestrial broadcasting receiving antenna (not shown) or a BS/CS (Broadcasting Satellite/ Communication Satellite) digital broadcasting receiving antenna (not shown). In this embodiment, the tuner 101 demodulates video image data of a two-dimensional video image included in the received broadcast signal, and outputs the video image data of the two-dimensional video image to the video image input module 104.

The ODD 102 reads/writes data from/to an optical disk on which various pieces of data are recorded. In this embodiment, the ODD 102 reads two-dimensional video image data from the optical disk, and outputs the two-dimensional video image data to the video image input module 104.

The HDD 103 reads/writes data from/to a magnetic recording medium. In this embodiment, the HDD 103 reads two-dimensional video image data from the magnetic recording medium, and outputs the two-dimensional video image data to the video image input module 104.

Two-dimensional video image data (two-dimensional moving image data) is inputted to the video image input module 104. Further, the video image input module 104 outputs the inputted two-dimensional video image data to the first image processor 105 and the second image processor 108. Note that two-dimensional video image data may be inputted to the video image input module 104 from modules other than those illustrated in FIG. 2. For example, two-dimensional video image data may be inputted to the video image input module 104 from a device such as a flash device provided inside the computer 100 or a portable flash device. Alternatively, video image data may be inputted to the video image input module 104 from an external device such as a reproducing device or broadcasting receiving device capable of outputting video image data.

The first image processor 105 is an image processing processor connected via a bus to an unillustrated CPU (Central Processing Unit) included in the computer 100, for example. Furthermore, the first image processor 105 includes the first decoder 106 and the depth calculator 107. In this embodiment, the first decoder 106 decodes the two-dimensional video image data, inputted to the first image processor 105 from the video image input module 104, to generate decoded data, and outputs the decoded data to the depth calculator 107.

The depth calculator 107 analyzes the inputted two-dimensional video image decoded data, and calculates a depth (depth level) of each pixel in the image with respect to a three-dimensional direction (depth direction or depth-wise direction). In this embodiment, the depth calculator 107 analyzes each image (picture) included in the decoded video image data, and uses, for example, a pixel motion between the pictures or a difference between pixel values in the same picture, thus calculating (estimating) a depth position of each pixel included in each picture. Then, the depth calculator 107 outputs the calculated depth (depth level) information of each pixel to the synchronization determination module 110 on a picture-by-picture basis. Moreover, in outputting the depth information, the depth calculator 107 outputs the depth information so that a time stamp (picture identification information), indicating to which picture in the video image the depth information is related, is assigned to the depth information.

The second image processor 108 is an image processing processor such as a GPU (Graphics Processing Unit) implemented on the same chip as the CPU included in the computer 100, for example. Further, the second image processor 108 includes functional modules such as: the second decoder 109; the image generator 111; and the signal processor 112.

The second decoder 109 decodes the two-dimensional video image data inputted to the second image processor 108, thereby generating decoded data. Then, the second decoder 109 outputs the decoded data to the synchronization determination module 110. Furthermore, in outputting the decoded data, the second decoder 109 outputs the decoded data so that a time stamp (picture identification information), indicating to which picture in the video image the decoded data is related, is assigned to the decoded data.

The depth information outputted from the depth calculator 107 and the two-dimensional video image decoded data outputted from the second decoder 109 are inputted to the synchronization determination module 110. Then, the synchronization determination module 110 selects and decides, from the inputted decoded data and depth information, the decoded data and depth information which are to be outputted to the image generator 111. In this embodiment, based on the time stamps of the inputted decoded data and depth information, the synchronization determination module 110 decides a combination of the decoded data and depth information to be outputted to the image generator 111.

Specifically, for example, if the time stamp of the inputted decoded data and that of the inputted depth information indicate the same picture, the synchronization determination module 110 outputs both of the decoded data and the depth information to the image generator 111.

On the other hand, for example, if the time stamp of the inputted depth information indicates the picture preceding the picture indicated by the time stamp of the decoded data, the synchronization determination module 110 abandons the depth information, and outputs the decoded data and subsequently inputted depth information (depth information of the next picture) to the image generator 111.

Further, for example, if the time stamp of the inputted decoded data indicates the picture preceding the picture indicated by the time stamp of the depth information, the synchronization determination module 110 outputs both of the decoded data and depth information to the image generator 111. Furthermore, in this case, the synchronization determination module 110 allows the depth information to be buffered, and upon input of decoded data of the next (subsequent) picture, the synchronization determination module 110 outputs the decoded data and the buffered depth information to the image generator 111.

Note that in addition to the data buffered by the foregoing process, the synchronization determination module 110 may allow each piece of the depth information and decoded data for each inputted picture to be buffered in a data storage region so as to be placed on a waiting list. Then, the synchronization determination module 110 may select a combination of the depth information and decoded data from the depth information and decoded data buffered and placed on the waiting list, and may output the selected data to the image generator 111. Moreover, the foregoing functions of the synchronization determination module 110 are executed by the CPU, for example.

Based on the inputted two-dimensional video image decoded data and depth information, the image generator 111 generates a three-dimensional display parallax image, i.e., a right eye image and a left eye image having a parallax therebetween. Then, the image generator 111 outputs the generated parallax image to the signal processor 112.

The signal processor 112 converts the inputted parallax image into a video image signal of a format displayable on a display device. In this embodiment, the signal processor 112 converts the inputted right eye and left eye images into video image signals, and outputs the video image signals of the right eye and left eye images alternately to the display module 113. Specifically, upon input of the right eye and left eye images, the signal processor 112 outputs the video image signal of one of the right eye and left eye images to the display module 113 and then outputs the video image signal of the other one of the right eye and left eye images to the display module 113. Then, the display module 113 displays a three-dimensional display video image by using the inputted video image signals.

Next, referring to FIGS. 3A to 3C, processing examples for parallax image generation performed by the computer 100 will be described.

Suppose that data of pictures P1 to P4 having picture numbers of 1 to 4 is inputted as encoded two-dimensional video image data to the video image input module 104. Then, the video image input module 104 outputs these pieces of picture data to both of the first decoder 106 and the second decoder 109 in ascending order of the picture number.

The first decoder 106 decodes each piece of the data of the pictures P1 to P4. The depth calculator 107 generates depth information A1 to A4 of the respective pictures based on the decoded data generated by the decoding, and outputs these pieces of the depth information A1 to A4 to the synchronization determination module 110. Furthermore, the second decoder 109 decodes each piece of the data of the pictures P1 to P4, and outputs decoded data B1 to B4 to the synchronization determination module 110.

In this embodiment, the synchronization determination module 110 decides, from the depth information A1 to A4 and decoded data B1 to B4 for the respective inputted pictures, the depth information and decoded data to be outputted to the image generator 111.

Figure 3A:
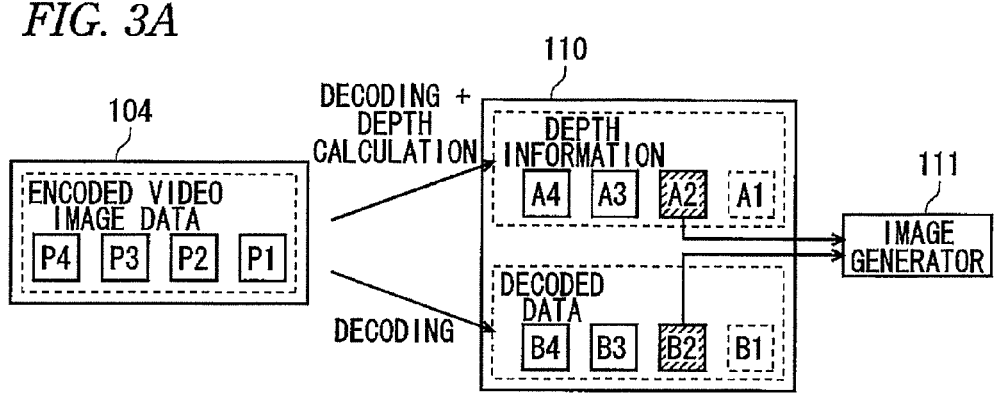
FIGS. 3A to 3C are diagrams illustrating processing examples for parallax image generation performed by the image processing apparatus according to the embodiment.

FIG. 3A is a diagram illustrating a processing example where the depth information A1 and the decoded data B1, which are associated with the picture P1, have already been outputted to the image generator 111 by the synchronization determination module 110. In this case, since the depth information A2 of the next picture and the decoded data B2 of the next picture are associated with the same picture P2, the synchronization determination module 110 outputs the depth information A2 and the decoded data B2 to the image generator 111.

Figure 3B:
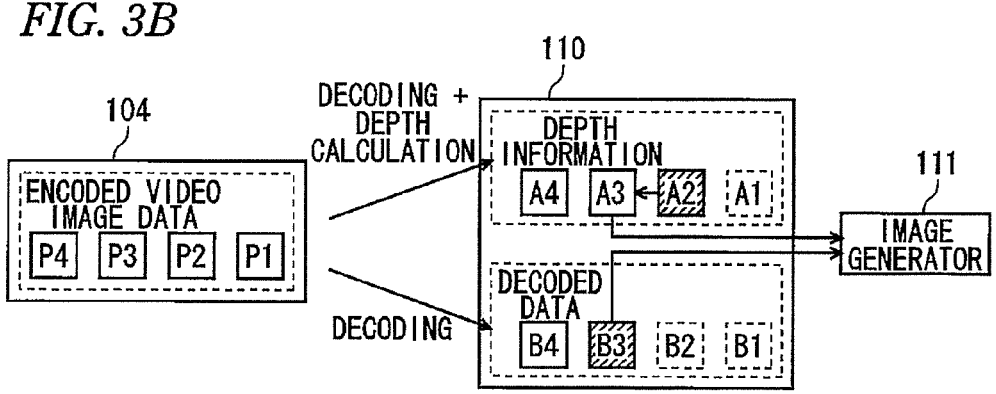

FIG. 3B is a diagram illustrating a processing example where the depth information A1 of the picture P1 and the decoded data B1 and B2 of the pictures P1 and P2 have already been outputted to the image generator 111 by the synchronization determination module 110. In this case, since the output of the depth information from the synchronization determination module 110 to the image generator 111 is delayed, the synchronization determination module 110 abandons the depth information A2, and outputs the depth information A3 of the next picture P3, which is subsequent to the depth information A2, and the decoded data B3 to the image generator 111. Specifically, if the time stamp of the depth information A2, which has not yet been outputted from the synchronization determination module 110 to the image generator 111, indicates the picture P2 preceding the picture P3 indicated by the time stamp of the decoded data B3 that has not yet been outputted, the synchronization determination module 110 abandons the depth information A2 of the preceding picture P2, and selects the depth information A3 of the next picture P3. Then, the synchronization determination module 110 outputs, to the image generator 111, the depth information A3 and decoded data B3 which are associated with the same picture P3.

Figure 3C:
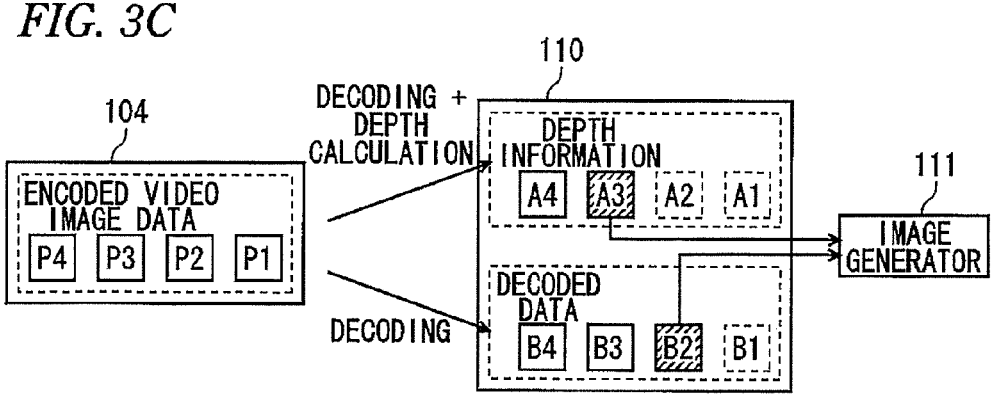

FIG. 3C is a diagram illustrating a processing example where the depth information A1 and A2 of the pictures P1 and P2 and the decoded data B1 of the picture P1 have already been outputted to the image generator 111 by the synchronization determination module 110. In this example, the time stamp of the decoded data B2, which has not yet been outputted to the image generator 111, indicates the picture P2 preceding the picture P3 indicated by the time stamp of the depth information A3 that has not yet been outputted. In this case, the synchronization determination module 110 does not abandon the decoded data B2 that has not yet been outputted, and outputs, to the image generator 111, the decoded data B2 and the depth information A3 of the picture P3 subsequent to the picture P2 with which the decoded data B2 is associated.

In other words, the synchronization determination module 110 outputs, to the image generator 111, the decoded data of the respective pictures inputted to the synchronization determination module 110. Furthermore, in outputting the decoded data, the synchronization determination module 110 selects, from the depth information inputted to the synchronization determination module 110, the depth information of the picture with which the decoded data to be outputted is associated or the depth information of the picture subsequent to the picture with which the decoded data to be outputted is associated, and then outputs the selected depth information to the image generator 111 together with the decoded data.

Figure 4:
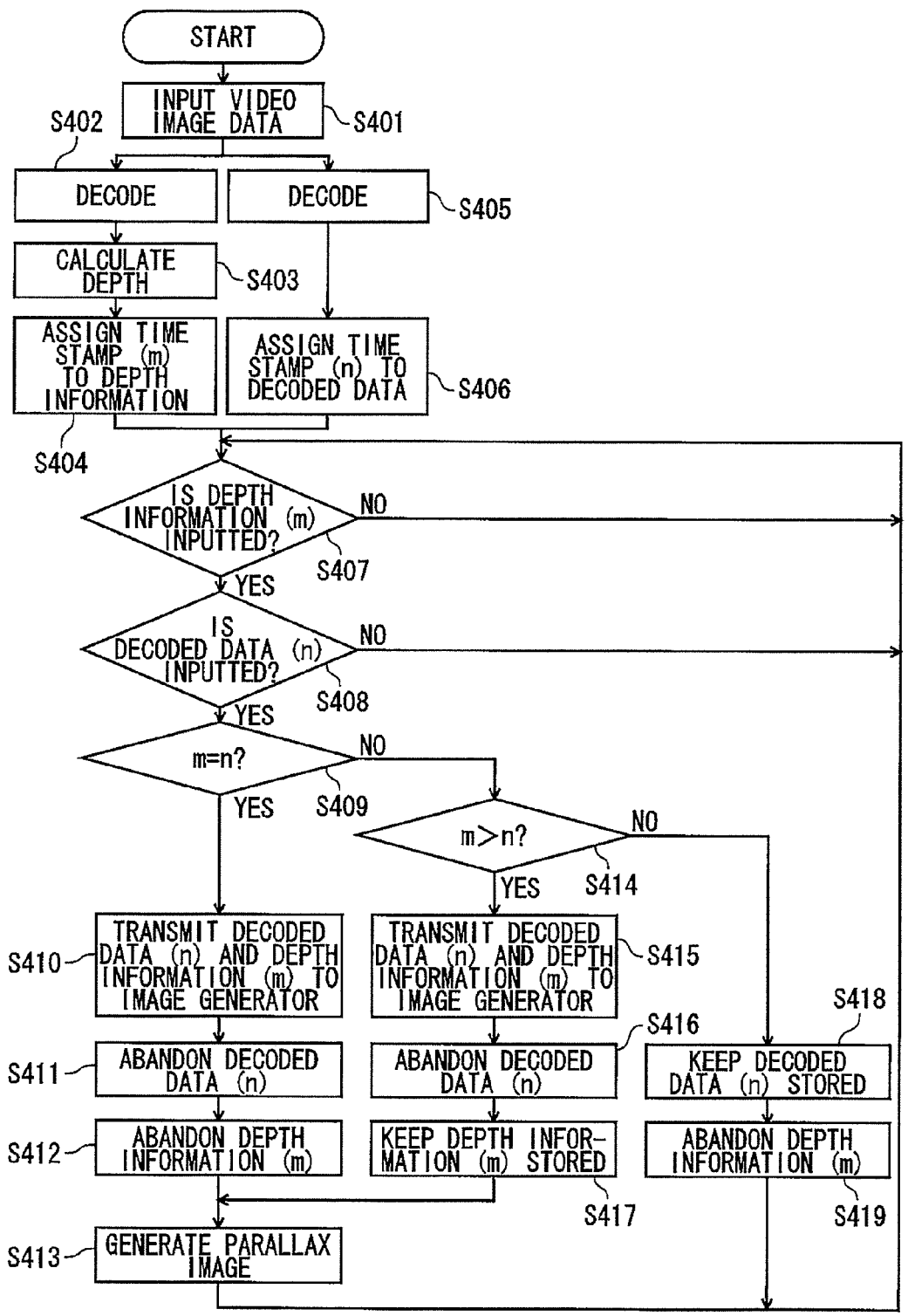
FIG. 4 is a chart illustrating a processing flow example for parallax image generation performed by the image processing apparatus according to the embodiment.

Next, referring to FIG. 4, a processing flow example for parallax image generation performed by the computer 100 will be described.

First, the video image input module 104 receives video image data (S401), and outputs the received video image data to the first decoder 106 and the second decoder 109. The first decoder 106 decodes the inputted video image data (S402). The depth calculator 107 calculates (estimates) a depth of each pixel in each picture of the decoded video image data (S403), assigns a time stamp for each picture to depth information of each picture, which has been generated by the calculation (S404), and outputs, to the synchronization determination module 110, the depth information to which the time stamp is assigned. The second decoder 109 decodes the inputted video image data (S405), assigns a time stamp for each picture to the decoded data of each picture, which has been generated by the decoding (S406), and outputs, to the synchronization determination module 110, the decoded data to which the time stamp is assigned.

Upon input of the depth information (Yes in S407) and upon input of the decoded data (Yes in S408), the synchronization determination module 110 buffers the inputted depth information and decoded data in a storage region such as a memory. Then, the synchronization determination module 110 determines whether or not the time stamp of the depth information, which has been inputted to the synchronization determination module 110 but has not yet been outputted to the image generator 111, and the time stamp of the decoded data, which has been inputted to the synchronization determination module 110 but has not yet been outputted to the image generator 111, indicate the same picture (S409).

If it is determined that the time stamps indicate the same picture (Yes in S409), the synchronization determination module 110 outputs, to the image generator 111, the decoded data and depth information which are associated with the same picture (S410). In this example, the synchronization determination module 110 abandons the outputted decoded data and depth information from the buffer storage region (S411 and S412). Subsequently, using the inputted decoded data and depth information, the image generator 111 generates a parallax image, i.e., right eye and left eye images corresponding to an image of the single picture (S413). Then, the synchronization determination module 110 executes the processes of S407 and S408 to receive input of the depth information and decoded data for the picture subsequent to the picture with which the decoded data and depth information abandoned in S411 and S412 are associated, and executes the process of S409 and the subsequent processes.

On the other hand, if it is determined in S409 that the time stamps of the decoded data and depth information do not indicate the same picture (No in S409), the synchronization determination module 110 determines whether or not the time stamp of the depth information indicates the picture subsequent to the picture indicated by the time stamp of the decoded data (S414). If the depth information is associated with the picture subsequent to the picture of the decoded data (Yes in S414), the synchronization determination module 110 outputs the depth information and decoded data to the image generator 111 (S415). Then, the synchronization determination module 110 abandons the outputted decoded data from the buffer region (S416), and maintains a state in which the outputted depth information is stored in the buffer region so as to output this depth information to the image generator 111 together with the decoded data of the next picture (S417). Subsequently, the image generator 111 generates a parallax image based on the inputted decoded data and the depth information for the picture subsequent to the picture of the decoded data (S413). Then, after having executed the processes of S407 and S408, the synchronization determination module 110 determines whether or not the decoded data of the picture subsequent to the picture of the decoded data abandoned in S416 and the depth information kept stored in S417 are associated with the same picture (S409), and executes the processes subsequent to S409 in accordance with a determination result.

If it is determined in S414 that the time stamp of the depth information indicates the picture preceding the picture indicated by the time stamp of the decoded data (No in S414), the synchronization determination module 110 keeps the decoded data stored in the buffer region (S418), and abandons the depth information (S419). Then, after having executed the processes of S407 and S408, the synchronization determination module 110 determines whether or not the decoded data kept stored in S418 and the depth information of the picture subsequent to the picture of the depth information abandoned in S419 are associated with the same picture (S409), and executes the subsequent processes in accordance with a determination result.

Although the embodiment of the present invention has been described, the present embodiment is provided by way of example and is not intended to limit the scope of the present invention. The present embodiment may be implemented in other various forms, and various omissions, substitutions and changes may be made without departing from the spirit of the present invention. The present embodiment and variations thereof are included in the scope and spirit of the present invention as well as in the invention disclosed in the claims and equivalence thereof.

What is claimed is:

1. An image processing apparatus comprising:
a receiving module configured to receive a moving image including a plurality of images;
a first processor configured to (1) decode the moving image input from the receiving module, (2) generate first decoded data for each of the plurality of images and (3) generate depth information based on the first decoded data for each of the plurality of images, wherein the depth information indicates an estimation of a depth of each of the plurality of images;
a second processor configured to (i) decode the moving image input from the receiving module and (ii) generate second decoded data for each of the plurality of images; and
an image generation module configured to generate a parallax image, when an image of the second decoded data generated by the second processor is subsequent to an image of the depth information generated by the first processor, by using the second decoded data generated by the second processor and next depth information pertaining to a next image subsequent to the image of the generated depth information generated by the first processor.

2. The image processing apparatus according to claim 1, wherein if the image of the second decoded data generated by the second processor precedes the image of the depth information generated by the first processor, the image generation module generates a parallax image by using the second decoded data and the depth information.

3. The image processing apparatus according to claim 2, wherein if the second decoded data generated by the second processor and the depth information generated by the first processor are associated with the same image, the image generation module generates a parallax image by using the second decoded data and the depth information.

4. The image processing apparatus according to claim 1, further comprising a display module configured to display the parallax image generated by the image generation module.

5. An image processing method comprising:
receiving a moving image including a plurality of images;
controlling a first processor configured to (1) decode the moving image input from the receiving module, (2) generate first decoded data for each of the plurality of images and (3) generate depth information based on the first decoded data for each of the plurality of images, wherein the depth information indicates an estimation of a depth of each of the plurality of images;
controlling a second processor configured to (i) decode the moving image input from the receiving module and (ii) generate second decoded data for each of the plurality of images; and
generating a parallax image, when an image of the second decoded data generated by the second processor is subsequent to an image of the depth information generated by the first processor, by using the second decoded data generated by the second processor and next depth information pertaining to a next image subsequent to the image of the generated depth information generated by the first processor.

6. The image processing method according to claim 5, wherein if the image of the second decoded data generated by the second processor precedes the image of the depth information generated by the first processor, a parallax image is generated by using the second decoded data and the depth information.

7. The image processing method according to claim 5, further comprising displaying the generated parallax image.

* * * * *